Feb. 18, 1936. E. D. KRAMP 2,031,565
POWER TRANSMITTING BELT
Filed Nov. 3, 1933
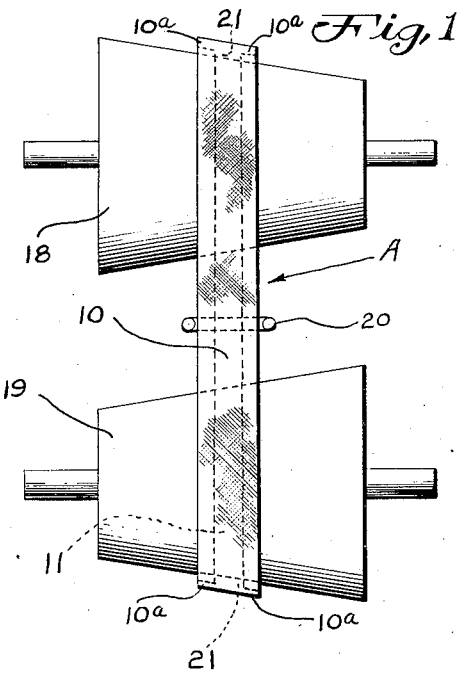
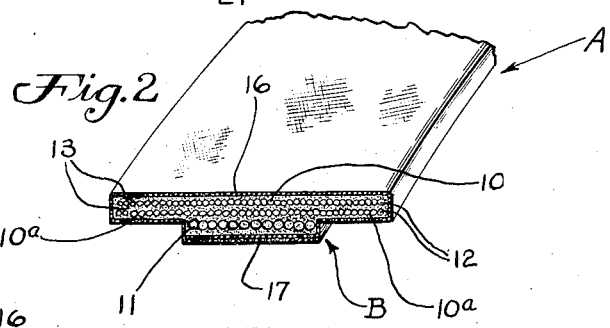
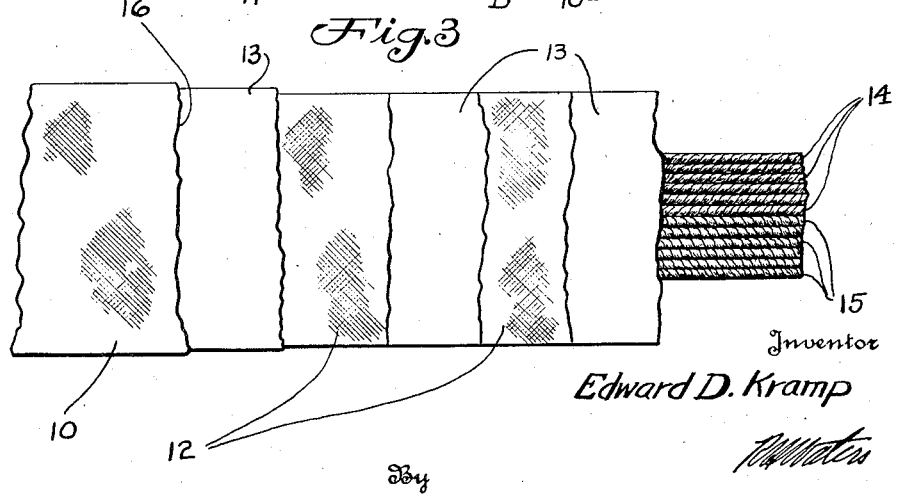
Inventor
Edward D. Kramp
By
Attorney Patented Feb. 18, 1936

2,031,565

UNITED STATES PATENT OFFICE 2,031,565

POWER TRANSMITTING BELT

Edward D. Kramp, Akron, Ohio, assignor to Wingfoot Corporation, Wilmington, Del., a corporation of Delaware Application November 3, 1933, Serial No. 696,462

3 Claims. (Cl. 74—232)

This invention relates to power transmission belts of the endless type, constructed of rubber, cord and fabric, and it refers particularly to belts which, in connection with variable speed pulleys, are subject to a frequent or constant lateral shifting to obtain variations in speed. In various devices such as textile spinning and twisting machines and the like, it is necessary to obtain a variable speed of considerable range, and one means of accomplishing this is by the use of a belt running on cone pulleys. The range in speed is dependent upon the length of the pulleys and the pitch or taper of their faces. The usual practice in drives of this nature has been to use the ordinary plain flat belt formed of either leather or rubberized fabric, but such belts become inefficient after a comparatively short period of time due to frequent contacting of the shifting means on their edges. This frictional wear sets in immediately causing a fraying of the edges which decreases the width of the contacting surface of the belt on the pulley, with a corresponding decrease in efficiency of the driving power of the belt, and causes the belt to have an unsightly appearance. In a short time the fibers of the frayed edges become of such length that they fold over and find their way between the contacting surface of the belt and pulleys, and this causes the belt to slip on the pulleys, which, in turn, causes irregularities in the product being turned out by the machine. Due to the frequent shifting and excessive wear of the edges of the ordinary type of flat belt, it has been common practice to use a belt of much greater width than necessary. This greater width of belt requires more pressure on the shifter which in turn causes more wear of the edges and a more difficult speed regulation.

The present invention overcomes the foregoing and other objectionable features of the prior art, and provides a new and novel belt which will have much longer life, coupled with greater efficiency during the entire period of its useful service.

More specifically, the invention contemplates a power transmission belt of substantially T-shape in cross-section and provided with wings or projecting side portions with which the shifting member contacts. These shifter-contacting or wing portions of the belt overhang the body or driving portion on each side. The pulley contacting surface being of less width than the wing portions, is protected from the destructive side wear by being out of contact with the belt shifting member. The wings or belt shifting member are made up of a plurality of plies of square-woven bias-cut fabric, the strands of the fabric crossing the belt in a diagonal direction, so that the strands will be presented to the shifting member laterally and the wear will be at their ends rather than in a longitudinal direction. This will reduce the wear to a minimum and the edges of the shifting portion of the belt will be permitted to remain more smooth and even. The present invention also eliminates the causes for using a belt that is of greater width than is necessary due to allowance for wear. With the belt shifting portion taking all the wear, the body or driving element of the belt is permitted to maintain its initial width of contacting surface with the pulleys. A less or more even pressure is exerted by the shifter on the wings than on a wider belt, and a smoother speed regulation is permitted.

These and other objects, features and advantages of the invention will be apparent from the following description in connection with the accompanying drawing, wherein:

Fig. 1 is a plan view showing the belt applied to a cone pulley drive;

Fig. 2 is a cross-sectional perspective view of a portion of the completed belt; and Fig. 3 is a plan view of a portion of the belt with portions cut away showing the various elements of its construction.

Referring now to the drawing, A designates the belt as a whole, and it will be noted that the belt is of substantially T shape in cross-section. The numeral 10 designates the belt shifting portion and 11 the body or driving portion. The belt shifting portion 10 is of substantially greater width than driving portion 11, the edges or wings 10ª overhanging the side edges of the driving or body portion 11. The belt shifting portion 10 is composed of a plurality of plies of square-woven bias-cut fabric 12 which have been frictioned and skim-coated with rubber by a process of calendering. The skim-coating provides an intermediate binder of rubber between the various plies, as shown at 13. The driving or body portion of the belt is composed of the rubberized twisted cords shown at B, which are comparatively large in cross-section due to the fact that they form the driving member of the belt and must bear the load of the power transmission from one pulley to the other. In order to give the driving member added strength, durability and uniformity in tension, one half of the cords have a right hand twist as indicated at 14, and the other half have a left hand twist as shown at 15. An outer covering or envelope 16 is employed, consisting of square-woven bias-cut fabric that has been frictioned and skim-coated with rubber but is of considerable less weight than the fabric 12, and more closely woven.

The belt may be made up in the usual manner either on one large drum, or on two smaller ones having adjustable means to vary the distance between their centers. In making a belt of this nature it is convenient to build it up inside out, in which case the outer covering or envelope 16 is first wound around the drum and spliced, after which the square-woven bias-cut plies 12 are wound centrally upon the envelope 16, one ply upon the other, so that the splice of one is staggered in relation to the splice of the other. The cords 14 and 15 are then wound centrally over the plies 12, preferably under slight tension. The side edges of the envelope are then folded and stitched around the plies 12 and the cords 14 and 15, so that they will overlap on the pulley-contacting or driving surface of the belt as shown at 17. This provides a double thickness of the envelope fabric at this point and a good wearing surface where the belt contacts with the face of the pulleys.

Fig. 1 shows the application of the belt A on a cone pulley drive consisting of the cone pulleys 18 and 19 between which is mounted a conventional belt shifter 20. It will be noted that approximately only one-half of the entire width of the belt contacts with the pulley surfaces as shown at 21, and this makes possible a finer speed adjustment of the complete drive.

Although the invention has been shown as applied to cone pulleys, it will be understood that it may be used with equal success on straight-faced pulleys where frequent shifting of the belt is required, and it is also to be understood that this invention is applicable to belts other than the endless type and may be made in long lengths and spliced and used in any desired length. In fact, the invention is susceptible of numerous modifications in the details of construction and arrangement of parts, and the right is herein reserved to make such changes as fall within the scope of the appended claims without departing from the spirit of the invention.

Having thus described the invention, what is claimed is:

1. A power transmission belt having a T-shaped cross-section and comprising a shifting member composed of a plurality of plies of rubberized square-woven bias-cut fabric, a power transmitting member composed of longitudinally disposed rubberized cords, a vulcanizable material interposed between the plies of fabric and between the cords and the ply adjacent to it, the power member being of less width than the shifting member, the greater width of the shifting member overhanging the side edges of the power member in the form of wings, an envelope of rubberized square-woven bias-cut fabric continuously encasing the entire structure and plying up on itself and forming a double thickness upon the pulley contacting surface of the power member, and the entire structure vulcanized.

2. A power-transmitting belt comprising a pulley-engaging, power-transmitting portion formed of a plurality of longitudinally extending, load-carrying rubberized cords in parallel arrangement, a belt-shifting portion formed of a plurality of plies of square-woven, bias-cut rubberized fabric, said belt-shifting portion being disposed at the outer side of said power-transmitting portion and being of greater width than the same so as to overhang a pulley in spaced relation thereto, and an outer envelope of square-woven, bias-cut rubberized fabric encasing both of said portions, and all vulcanized together to provide a unitary structure of T-shape in cross-section, the bias-cut fabric of said belt-shifting portion and said envelope presenting the ends of the warp and woof strands thereof to the wearing action of the belt-shifting mechanism.

3. A power-transmitting belt comprising a pulley-engaging, power-transmitting portion formed of a plurality of longitudinally extending, load-carrying rubberized cords in parallel arrangement, the cords on opposite sides of the median line of said power-transmitting portion being twisted in opposite directions to equalize the torsion thereof, thus maintaining the cross-sectional configuration of the belt, a belt-shifting portion formed of a plurality of plies of square-woven, bias-cut rubberized fabric, said belt-shifting portion being disposed at the outer side of said power-transmitting portion and being of greater width than the same so as to overhang a pulley in spaced relation thereto, and an outer envelope of square-woven, bias-cut rubberized fabric encasing both of said portions, and all vulcanized together to provide a unitary structure of T-shape in cross-section, the bias-cut fabric of said belt-shifting portion and said envelope presenting the ends of the warp and woof strands thereof to the wearing action of the belt-shifting mechanism.

EDWARD D. KRAMP.